United States Patent [19]
Sakai et al.

[11] 4,374,410
[45] Feb. 15, 1983

[54] DATA PROCESSING SYSTEM

[75] Inventors: Toshihiro Sakai, Kawasaki; Tetsuji Kuhara, Matsudo, both of Japan

[73] Assignees: Fujitsu Limited, Kawasaki; USAC Electronic Industrial Co., Ltd., Ishikawa, both of Japan

[21] Appl. No.: 64,725

[22] Filed: Aug. 8, 1979

Related U.S. Application Data

[63] Continuation-in-part of Ser. No. 949,115, Oct. 16, 1978, abandoned.

[30] Foreign Application Priority Data

Oct. 8, 1977 [JP] Japan ............... 52-121154

[51] Int. Cl.³ ............................... G06F 9/36
[52] U.S. Cl. ................................. 364/200
[58] Field of Search ............ 364/200, 900; 365/230

[56] References Cited

U.S. PATENT DOCUMENTS

| | | | |
|---|---|---|---|
| 3,693,165 | 9/1972 | Reiley et al. | 364/200 |
| 3,821,715 | 6/1974 | Hoff, Jr. et al. | 364/200 |
| 3,969,706 | 7/1976 | Proebsting et al. | 365/230 |
| 4,037,209 | 7/1977 | Nakajima et al. | 364/200 |
| 4,057,848 | 11/1977 | Hayashi | 364/200 |
| 4,128,875 | 12/1978 | Thurber et al. | 364/200 |
| 4,130,870 | 12/1978 | Schneider | 364/200 |
| 4,145,738 | 3/1979 | Inoue et al. | 364/200 |
| 4,155,119 | 5/1979 | De Ward et al. | 364/200 |
| 4,163,280 | 7/1979 | Mori et al. | 364/200 |
| 4,188,662 | 2/1980 | Ishibashi | 364/200 |

*Primary Examiner*—Gary Chin
*Attorney, Agent, or Firm*—Staas & Halsey

[57] ABSTRACT

In a data processing system in which a data processing unit has an M-bit address register and is connected via an N-bit address bus with a memory (where $N < M < 2n$), the content of the address register is sent out on the address bus in two stages. Namely, high-order N bits of the address register are sent out first, and low-order N-bits are sent out next. One of the bits of the address register is sent out twice by the first and second sending-out operations. The system includes, in combination, various gates and a multiplexer to accomplish data transfer selectively for both virtual memory and real memory operation.

7 Claims, 12 Drawing Figures

DATA PROCESSING SYSTEM

CROSS REFERENCE TO RELATED APPLICATION

This is a continuation-in-part of U.S. patent application Ser. No. 949,115, filed Oct. 16, 1978, now abandoned.

BACKGROUND OF THE INVENTION

1. Field of the Invention

This invention relates to a data processing system which has an address bus whose bus width is smaller than the number of bits of an address register of a central processing unit.

2. Description of the Prior Art

On account of the progress of semiconductor technology, there have now been fabricated microcomputers in which central processing units are each formed with a one-chip LSI. In such an LSI, the number of input/output pins is limited; for example, the number of address pins is usually limited to about sixteen. Further, there is a demand for the adoption of a virtual memory system in microcomputers.

Figure 1A:
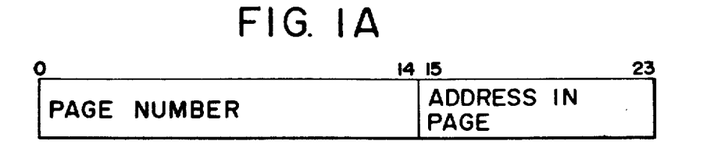
FIGS. 1A and 1B are diagrams explanatory of a logical address and a real address, respectively.
Figure 1B:
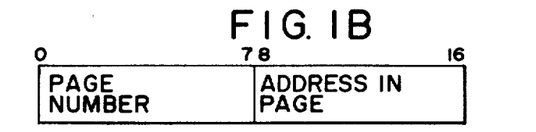

Consider the case where a logical address of the virtual memory system is such as, for example, shown in FIG. 1A; that is; the 0th to 14th bits indicate a page number in virtual memory, and the 15th to 23rd bits an address in page, and the real memory capacity is, for instance, 128K bytes. In such case, referring to FIG. 1B, the 0th to 7th bits indicate a page number or a leading address of the page in real memory, and the 8th to 16th bits an address in page.

Where the number of address pins is 16, a central processing unit cannot at one time send out such a 24-bit logical address as shown in FIG. 1A. In the case of an ordinary data processing system which is not a virtual memory system, the central processing unit is required to transfer such a 17-bit real address, as is shown in FIG. 1B, to a main memory without address conversion. However, if the number of address pins is 16, as mentioned above, it is impossible to send out at one time the 17-bit real address.

Figure 2:
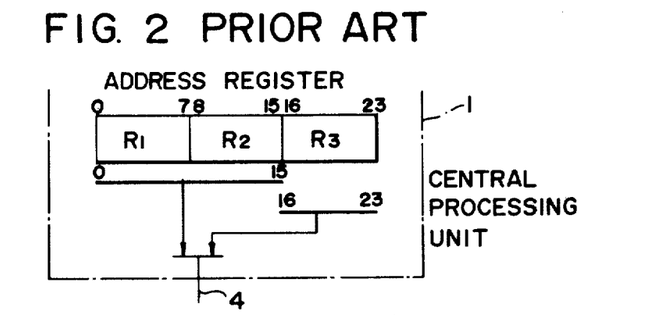
FIG. 2 is a block diagram showing a conventional address information transmitting part.

In the prior art systems, 8-bit registers $R_1$, $R_2$ and $R_3$ are provided in a central processing unit 1, as shown in FIG. 2, and, in the case of delivering a logical address, address information of the 0th to 15 th bits is first sent out on an address bus 4, and then address information of the 16th to 23rd bits is sent out on the address bus 4. In this case, the bus width of the address bus 4 is 16-bit.

Figure 3:
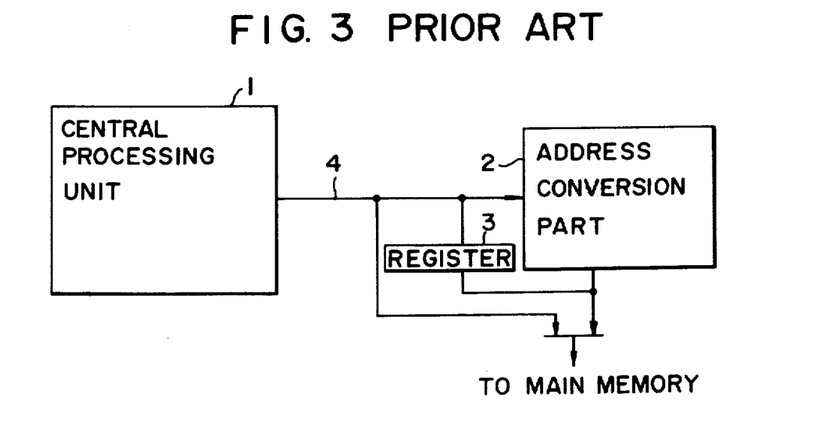
FIG. 3 is a block diagram illustrating the principal part of a conventional data processing system of a virtual memory system.

The page number in virtual memory, comprising the 0th to 14th bits (of the address information which is totally delivered in two transmissions), is converted into a page number in real memory (0th to 7th bits in FIG. 1B) by means of a dynamic address conversion part 2 shown in FIG. 3. The page number of the real address is thus provided by the dynamic address conversion part 2, the 15th bit of the logical address page number being retained unconverted, and the address in page (15th to 23rd bits) being transferred subsequently. Then, a real address is formed, which real address is provided to a main memory (not shown in FIG. 3) for access thereto.

In an ordinary data processing system which is not a virtual memory system, such real address information of the 17-bit configuration shown in FIG. 1B is stored in the registers $R_1$, $R_2$ and $R_3$ which make up an address register 1a. In this instance, the information is stored with the 16th bit lying at the right-most end. Referring to FIG. 3, the address information of the 0th to 8th bits is provided on the address bus 4 and stored in a register 3. Next, the address information of the 9th to 16th bits is provided on the address bus 4 to form, with the address information previously stored in the register 3, address information of a 17-bit configuration, and this address information is transferred to the main memory.

As described above, in the case of the address bus having a bus width (16 bits) smaller than the number of bits (24 bits) of the registers $R_1$, $R_2$ and $R_3$, the address information is divided into two portions and transferred in two transmissions so as not to overlap each other. In the above example of the prior art, the address information transferred second is 8-bit in size, so that in the case of the 24-bit configuration the address information corresponding to the full bus width of 16 bits is transferred first, whereas in the case of the 17-bit configuration the 9-bit address information is transferred first.

It is also disclosed, for example, in U.S. Pat. No. 3,969,706, that address information or data is transmitted and received in two stages due to the limitation imposed on the number of input/output pins. In this case, the address information or data is usually transmitted and received half at a time.

In the case of a virtual memory system, address conversion of the high-order part of the logical address is required, but when the high-order bit part is larger than M/2 (where M is the number of bits of a logical address register and the size of the address bus is assumed to be M/2), the number of said bits necessary for the address conversion cannot be obtained unless and until the second or subsequently transferred address information is received, so that the access speed becomes low as a result. When the high-order bit part is smaller than M/2, the address conversion can be achieved immediately upon reception of the first transferred address information, but means are required for holding an unconverted one of the bits of the first transferred address information when the conversion result is combined with the remaining bits.

In an ordinary data processing system which is not a virtual memory system, a real address having a number of bits smaller than M is set in the low order positions of an address register. The number of bits of this real address is usually larger than M/2, so that in the system of the type transferring address information half at a time, as referred to above, it is necessary to retain some of the first transferred bits.

SUMMARY OF THE INVENTION

An object of this invention is to provide a data processing system which enables addressing without increasing the amount of hardware used.

Another object of this invention is to provide a data processing system which is designed to transfer, by two transfer operations, address information having a larger number of bits than the bus width of an address bus, so as to maintain the access operation speed unchanged, even in the case of requiring address conversion, and to minimize bit retention hardware, even in the case of retaining some of the bits transferred.

Briefly stated, in the data processing system of this invention in which a data processing unit, having an address register of M bits ($N<M<2N$), and a memory are interconnected via an N-bit address bus, high-order N bits of the address register are first transferred and low-order bits of the address register are then transferred, some of the bits being transferred twice.

Other objects, features and advantages of this invention will become apparent from the following description taken in conjunction with the accompanying drawings.

DESCRIPTION OF THE PREFERRED EMBODIMENTS

Figure 4:
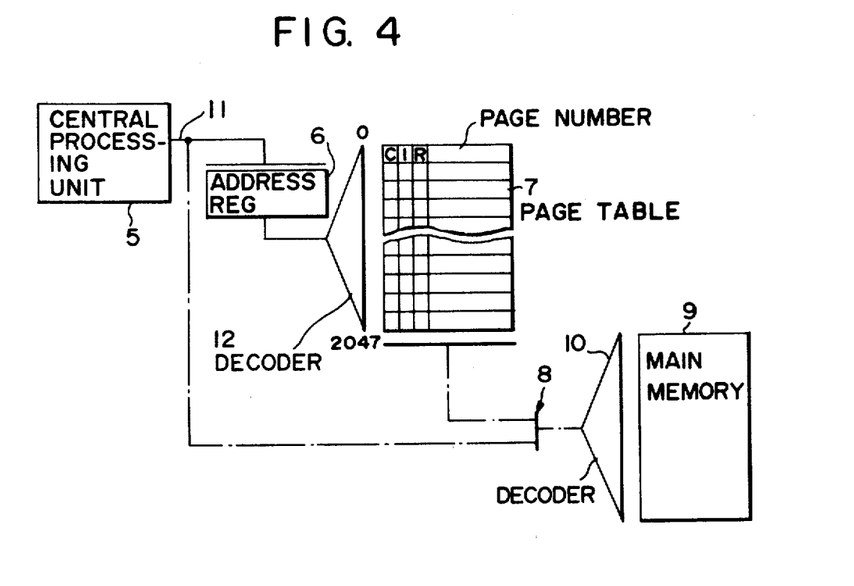
FIG. 4 is a block diagram showing the principal part of an embodiment of this invention.

FIG. 4 illustrates in block form the principal part of an embodiment of this invention. Reference numeral 5 indicates a central processing unit; 6 designates a page table address register; 7 identifies a page table; 8 denotes a multiplexer; 9 represents a main memory; 10 and 12 show address decoders; and 11 refers to an address bus. The following description will be given on the assumption that the address bus 11 has a bus width of 16 bits. The page table 7 is formed, for example, with a random access memory and, in the case of the logical memory capacity being 1 M byte, the page table 7 has 0th to 2047th addresses, each having a one-to-one correspondence to respective page numbers of a logical address. Further, each address has written therein a change bit C, an invalid bit I, a reference bit R, and a leading address of a page in real memory, that is, the page number in real memory.

Figure 5A:
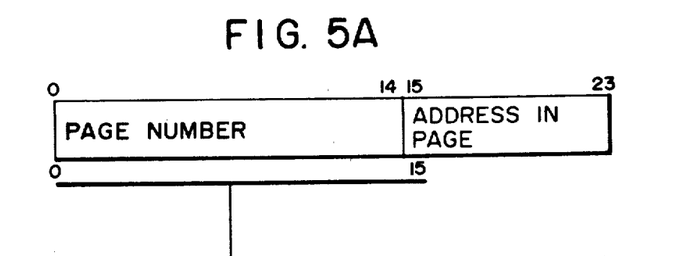
FIGS. 5A and 5B are diagrams explanatory of the transmission of a logical address.
Figure 5B:
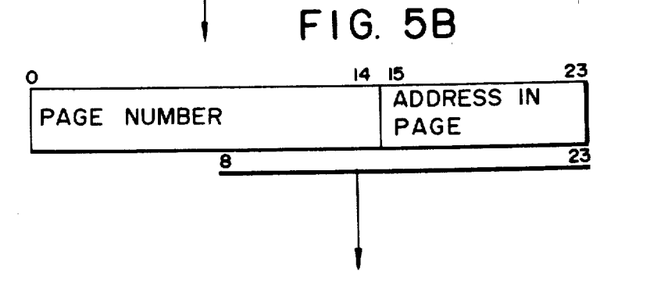

FIGS. 5A and 5B are explanatory of the operation of an address information transmitting part of the central processing unit. The address information transmitting part first sends out address information of 0th to 15th bits, as shown in FIG. 5A, and then sends out address information of 8th to 23rd bits, as shown in FIG. 5B.

Figure 6:
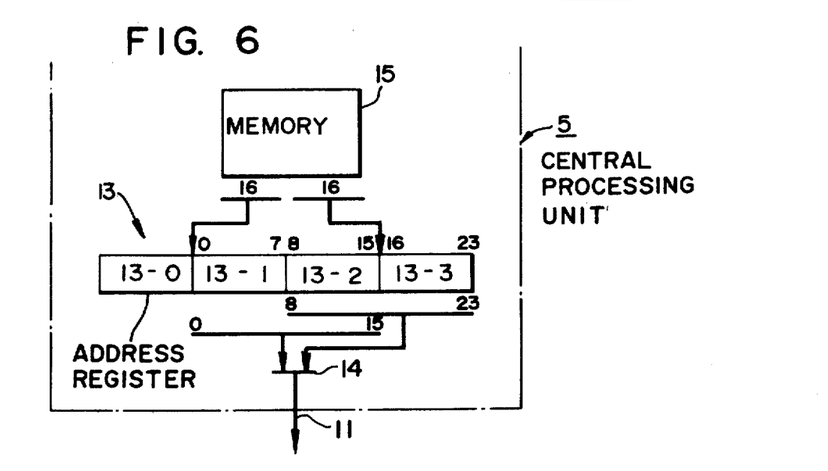
FIG. 6 is a block diagram illustrating the principal part of an address information transmitting part of the embodiment of this invention.

FIG. 6 illustrates in block form the principal part of the address information transmitting part of the central processing unit 5. Reference numerals 13-0 through 13-3 indicate registers forming an address register 13, the registers 13-1 through 13-3 respectively corresponding to the registers $R_1$ through $R_3$ shown in FIG. 2. Reference numeral 14 designates a multiplexer, and numeral 15 identifies a memory. Address information is stored in the memory 15, and is then read out therefrom, 16 bits at a time, for input to the address register 13. Where the logical address in a virtual memory system has a 24-bit configuration, the 0th to 23rd bits are set, by two readout operations from the memory 15, in the registers 13-1 through 13-3. If, in the case of a system other than a virtual memory system, a real address has a 17-bit configuration, the 0th to 16th bits of the real address information are set in 7th to 23rd bits, respectively, of the registers 13-1 through 13-3.

In the case of the data processing system being operated as a virtual memory system, the page number of the 0th to 14th bits of the logical address and the 15th bit of the address in page, totalling 16 bits in all, are first sent out on the address bus 11, as shown in FIG. 5A. The page number in virtual memory is set in the page table address register 6 and is decoded by the decoder 12 so as to access the page table 7. When the invalid bit I of the page accessed is "0", the page number in real memory is provided as an output. Then, as depicted in FIG. 5B, address information of the 8th through 23rd bits is sent out on the address bus 11 and is combined with the page number read out of the page table 7 to form a real address.

Figure 7:
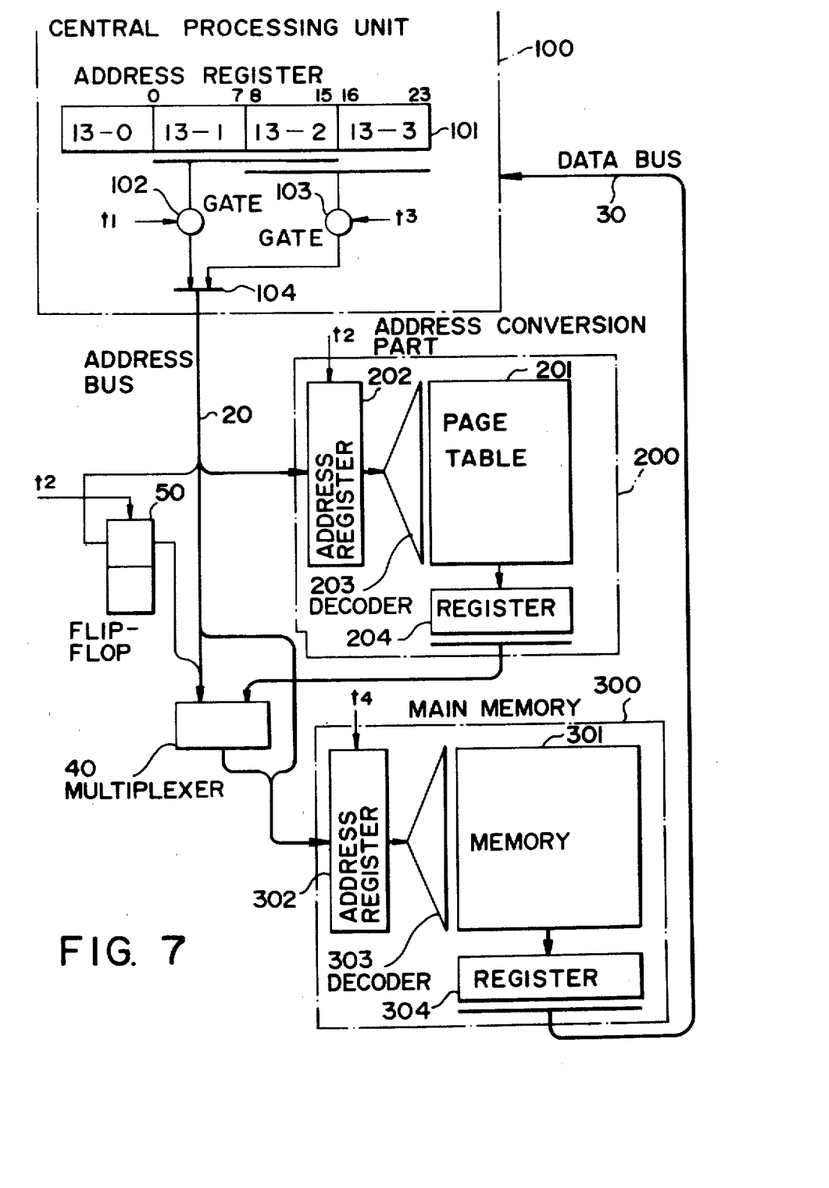
FIG. 7 is a detailed block diagram of the embodiment of this invention.
Figure 8:
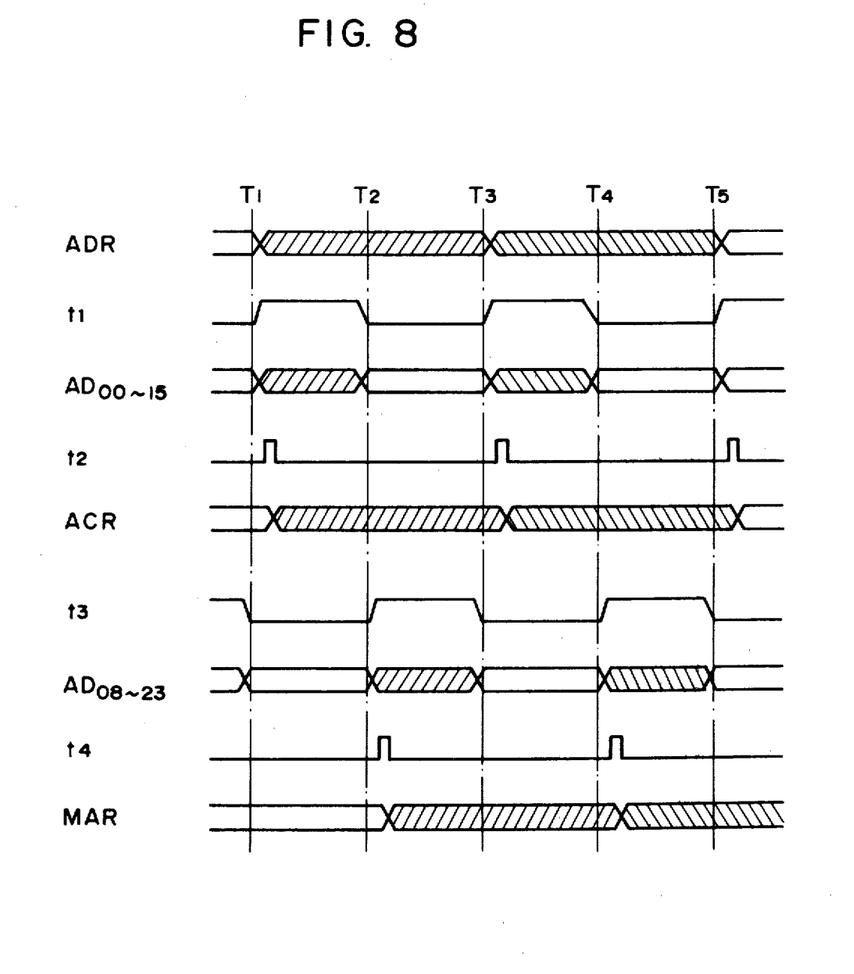
FIG. 8 is a timing chart explanatory of the operation of the present invention.

Turning now to FIG. 7 which shows a specific operative example of this invention, and to FIG. 8 which shows a timing chart, the invention will be described in more detail.

Let it be assumed that the logical address in a virtual memory system has a 24-bit configuration, that the page number and the address in page are 15-bit and 9-bit, respectively, that the real address in the case of a system other than a virtual memory system has a 17-bit configuration, and that the address bus has a 16-bit bus width. Further, let it be assumed that the 15-bit initial page number in virtual memory is to be converted to an 8-bit real page number in real memory.

In the case of a virtual memory system, the logical address is set in an address register 101 composed of registers 13-0 through 13-3 in a central processing unit 100, as previously described above with reference to FIG. 6. For example, as shown by timing diagram ADR in FIG. 8, the logical address is set at times T1 through T3, and (further referring to both FIG. 7 and FIG. 8) a gate 102 is opened by a gate timing signal t1 so as to send out address information of the 0th to 15th bits to an address bus 20 via an OR gate 104. This is shown by timing diagram $AD_{00\sim15}$ in FIG. 8, and the hatched part between times T1 and T2 represents effective information. By a timing signal t2, the 0th to 14th bits are set in an address register 202 of an address conversion part 200. This is shown by timing diagram ACR in FIG. 8.

The information of the 0th to 14th bits, indicating the page number of the logical address set in the address register 202, is decoded by a decoder 202 to permit access of page table 201 by means of which the page number in real memory is read out therefrom, as described above, and is set in a register 204. The page number of the 8-bit configuration, thus set in the register 204, is transferred to a multiplexer 40.

As will be seen below, multiplexer 40 is provided with an input MODE which takes on a value of 0 when the data processing system is being operated as a virtual memory system, and takes on a value of 1 when the data processing system is being operated as a real memory system.

In the particular case now being described, since the data processing system is being operated as a virtual memory system, MODE has the value 0. Multiplexer 40 responds to this condition by passing the 8-bit page number in real memory to address register 302 in main memory 300. Further details of the multiplexer 40 are provided below.

By means of a gate timing signal t3 between times T2 and T3 following the gate timing signal t1, a gate 103 is opened so as to send out the information of the 8th to 23rd bits of the address register 101 on the address bus 20 through OR gate 104. This is represented by timing diagram $AD_{08-23}$ in FIG. 8. The 15th to 23rd bits of this address information are, by means of timing signal t4, applied directly to the address register 302 (in main memory 300), where they are combined with the address information (real page number) previously provided via multiplexer 40 by the address conversion part 200 and set by timing signal t4 in address register 302 of main memory 300. This is represented by timing diagram MAR in FIG. 8. In the latter regard, it is to be noted that multiplexer 40, in response to MODE=0 (for a virtual memory system), blocks the 8th to 14th bits provided by gate 104 (the 15th through 23rd bits being provided by gate 104 directly to address register 302, as previously stated).

Thus, the address information in real memory set in the address register 302 is a combination of the 8-bit page number in real memory provided by the address conversion part 200 and the address in page of the 15th to 23rd bits from the 8th to 23rd bits sent out on the address bus 20 during time t3.

This real address information is decoded by a decoder 303 so as to permit access to memory 301, and information read out therefrom is set in a register 304, thereafter being transferred via a data bus 30 to central processing unit 100.

As described above, by initially sending out the first address information, the page number of the logical address can be immediately converted into a page number in real memory, and, by combining the page number in real memory with the second address information, the main memory can be accessed without employment of a bit retention technique or means.

Where the data processing system is not of the virtual memory system type, a real address is set in the 7th to 23rd bits of the address register 101 of the central processing unit 100. The address information initially sent out by the gate timing signal t1 covers the 0th to 15th bits, and the address information subsequently sent out by the gate timing signal t3 ranges from the 8th to 23rd bits. The 7th bit (one bit of the real address information of the 17-bit configuration) sent out first is latched by the timing signal t2 in a flip-flop 50.

As concerns the 8th to 23rd bits sent out by timing signal t3, the 8th to 14th bits are provided to multiplexer 40, while the 15th to 23rd bits are provided directly to register 302. The 7th bit is combined, by the multiplexer 40, with the 8th to 14th bits sent out during time t3, and the combination is provided during time t4 to register 302, the 15th to 23rd bits sent out during time t3 being provided directly to register 302 during time t4, whereby to access the main memory 300. In this case, the 1-bit flip-flop, or the like, comprises a bit retaining means.

In the event that the real address has a 16-bit configuration, a bit retaining means such as the flip-flop 50 is unnecessary. That is, the real address information is set in the 8th to 23rd bits of the address register 101, so that the address information subsequently sent out may be set, as it is, in the address register 302 of the main memory 300.

Figure 9:
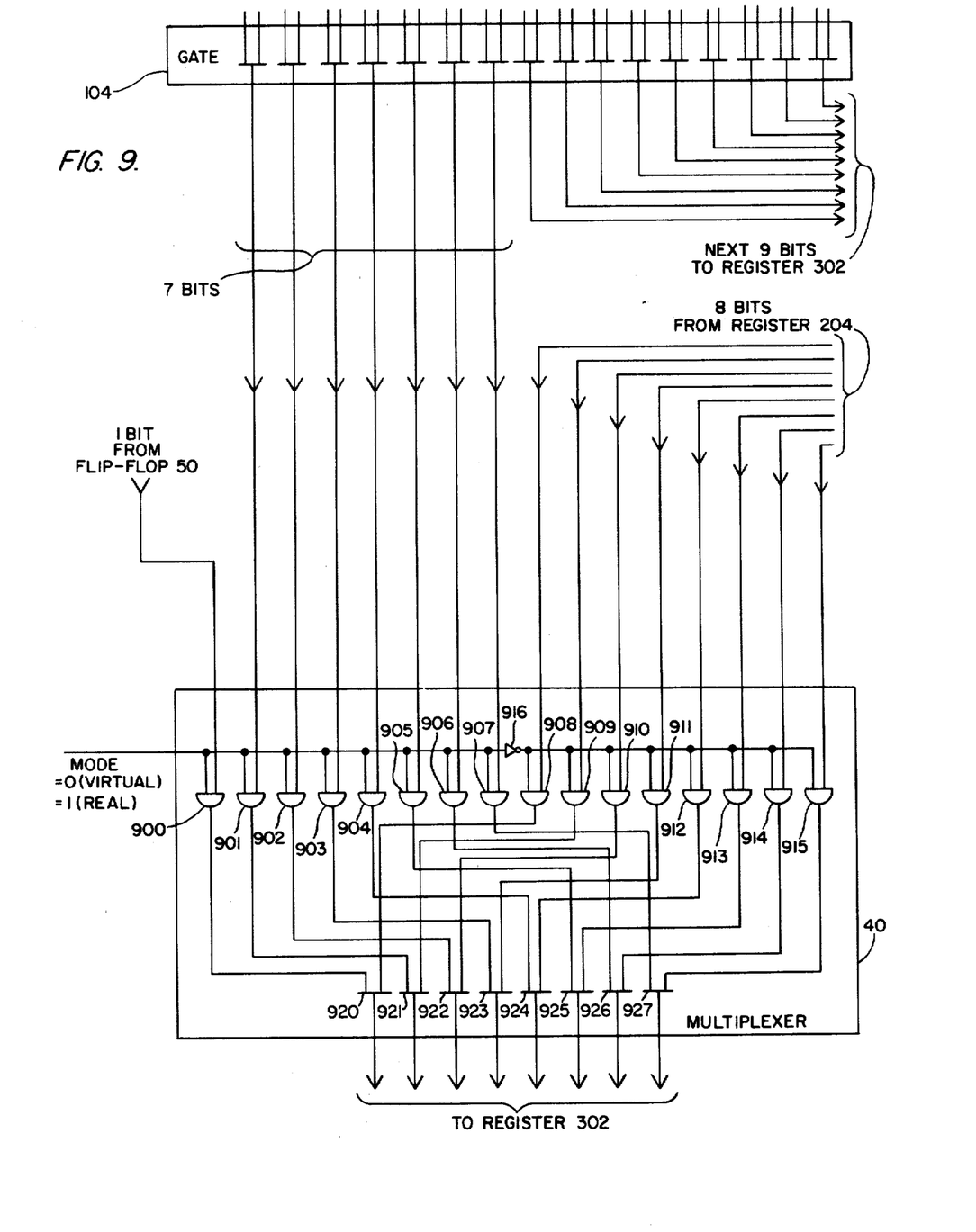
FIG. 9 is a detailed logic block diagram of the multiplexer 40.

FIG. 9 is a detailed logic block diagram of the multiplexer 40. Multiplexer 40 basically comprises AND gates 900 through 915, inverter 916, and OR gates 920 through 927.

In operation, multiplexer 40 receives a MODE input which, as previously explained, has the value 0 for a virtual memory system and 1 for a real memory system. During operation of a virtual memory system, AND gates 900 through 907 are disabled, so that the seven bits received from gate 104 are blocked, while AND gates 908 through 915 are enabled so that the eight bits from register 204 are not blocked. Thus, the page number in real memory, as provided by address conversion part 200 (FIG. 7) is provided via OR gates 920 through 927 as an output of multiplexer 40 to register 302.

On the other hand, during real memory system operation (MODE=1), AND gates 900 through 907 are enabled so as to pass the one bit from flip-flop 50 and the seven bits from gate 104 through multiplexer 40 to register 302; conversely, AND gates 908 through 915 are disabled, thus inhibiting passage of the eight bits from register 204 through multiplexer 40 to register 302.

Thus, as previously explained, during virtual memory system operation, multiplexer 40 passes the 8-bit page number in real memory (from register 204) to address register 302, where it is combined with the address in page (15th through 23rd bits) provided directly to address register 302 by gate 104, the 8th through 14th bits from gate 104 being blocked by disabled AND gates 900 through 907 of multiplexer 40. During real system operation, multiplexer 40 blocks—via AND gates 908 through 915—any output from register 204 from passing therethrough, but passes—via enabled AND gates 900 through 907—the 7th bit from flip-flop 50 and the 8th through 14th bits from gate 104 to the register 302, where they are combined with the 15th through 23rd bits from gate 104 (again provided directly to register 302).

Figure 10:
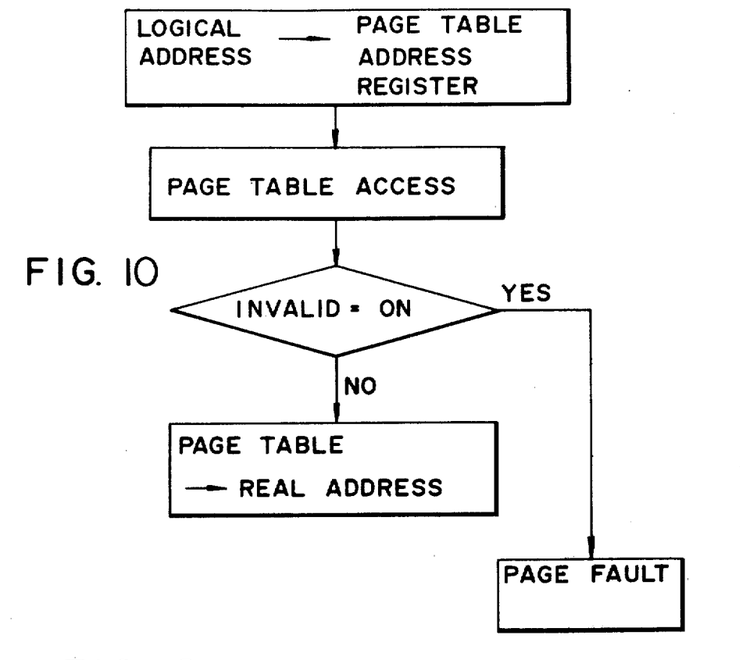
FIG. 10 is a flowchart of the conversion of a logical address to a real address.

FIG. 10 shows a flowchart for the operation of converting a logical address to a real address. The page number of the logical address is set in a page table address register, and a page table is accessed so as to read out a page corresponding to the page number. If the invalid bit of the page is ON, that is, a logic "1", it indicates that the page does not exist in real memory, so that a page fault interrupt occurs, by which the corresponding page is written in real memory from an external memory; at the same time, the page table is updated. When the invalid bit is OFF or a logic "0", the output from the page table and the address in page subsequently sent out are combined to form a real address.

In accordance with the present invention, in a data processing unit using address information larger than the bus width of an address bus, it is possible to achieve addressing by making effective use of the address bus and, in this case, means for temporarily holding or retaining a part of the address information need not always be provided. However, if such is provided, it may be of a very small capacity, as described above.

It is possible to adopt either the technique of switching the logical address mode (the operating in the case of the virtual memory system) and the real address mode (the operation in the case of the virtual memory system being not used) in the midst of a program, or that of fixing either one of the above-said modes for each data processing system. In the case of the technique of switching the modes in the midst of a program, a memory is accessed using the logical address mode during an application program (for example), and using the real address mode during an executive program called OS (Operating System), whereby the capacity of the address conversion part can be saved.

In the case of employment of the techniques of fixing either one of the modes, if the address space can be kept to a relatively small capacity, the cost of the data processing system can be reduced by omitting the address conversion part and by operating the system only in the real address mode. In that instance, it is sufficient that a mode designating signal is set in a semi-fixed manner by a manual switch, or the like. If the virtual memory system is not to be used in the future, the multiplexer 40 can also be dispensed with.

It will be apparent that many modifications and variations may be effected without departing from the scope of the novel concepts of this invention.

What is claimed is:

1. A data processing system, comprising:
   a central processing unit having a logical address mode and a real address mode and having an address register for storing a logical address or a real address in dependence upon whether said central processing unit is in the logical address mode or the real address mode, said address register having a number of bit positions greater than N but less than 2 N (where N is an integer), said bit positions including a block of N high-order bits and a block of N low-order bits;
   a main memory;
   an N-bit address bus operatively connected to the central processing unit and the main memory;
   sending means for sending the content of the address register out on the address bus in accordance with said block of high-order N bits of the address register being sent out first and said block of low-order N bits of the address register being sent out second, said sending means including means for sending the N bits so that said block of high-order N bits is overlapping with some of the bits in said block of low-order N bits; and
   address conversion means, operatively connected to the N-bit address bus and the main memory, for converting said block of high-order N bits into a page number in the main memory when said central processing unit is in the logical address mode, so that after said block of high-order N bits and said block of low-order N bits have been sent by said sending means, an address for accessing said main memory is provided, whether said central processing unit is in the real address mode or the logical address mode.

2. A data processing system according to claim 1, wherein said system further comprises means for setting a page number portion of the logical address in a predetermined number, smaller than N, of the bits of said block of high-order N bits of the address register of the central processing unit, and means for setting an address in page portion of the logical address in the remaining bit positions of said address register when said central processing unit is in the logical address mode, wherein said page number portion is sent to said address conversion means.

3. A data processing system according to claim 1, further comprising means for setting the real address in said block of low-order N bits and in a predetermined number of the bits of said block of high-order N bits of the address register when said central processing unit is in the real address mode.

4. A data processing system according to claim 1, further comprising means for setting the real address in a predetermined number, smaller than N, of the low-order N bits of the address register when said central processing unit is in the real address mode, said sending means comprising means for sending out at least a part of said real address from the address register at least a first time and a second time, said system further comprising means for accessing said main memory in accordance with said real address having the number of bits smaller than N and sent out from said address register the second time, regardless of the content of the N bits sent out from said address register the first time.

5. A data processing system according to claim 3, wherein said sending means comprises means for sending out the N high-order bits from said address register at a first time, and means for sending out the N low-order bits from said address register at a second time, said system further comprising means for retaining at least one bit of the N high-order bits sent out from said address register at the first time, and means for combining said retained at least one bit with the N low-order bits sent out from the address register at the second time to form the address for accessing said main memory, when said central processing unit is in the real address mode.

6. A data processing system, comprising:
   a central processing unit having a logical address mode and a real address mode and having an address register for storing a logical address or a real address in dependence upon whether said central processing unit is in the logical address mode or the real address mode, said address register having a number of bit positions greater than N but less than 2 N (where N is an integer), said bit positions including a block of N high-order bits and a block of N low-order bits;
   means for setting a page number portion of the logical address in a predetermined number, smaller than N, of the bits of said block of high-order N bits of the address register of the central processing unit when said central processing unit is in the logical address modes;
   means for setting an address in page portion of the logical address in the remaining bit positions of said address register when said central processing unit is in the logical address mode;
   means for setting a real address in said block of low-order N bits and in a predetermined number of the bits of said block of high-order N bits of the address register when said central processing unit is in the real address mode;
   a main memory;
   an N-bit address bus operatively connected to the central processing unit and the main memory;
   sending means for sending the content of the address register out on the address bus in accordance with said block of high-order N bits of the address register being sent out first and said block of low-order N bits of the address register being sent out second, said sending means including means for sending the N bits so that said block of high-order N bits is overlapping with some of the bits in said block of low-order N bits, said sending means sending predetermined ones of said 2 N bits twice; and address conversion means, operatively connected to the N bit address bus and the main memory, for converting said block of high-order N bits into a real page number in the main memory when said central processing unit is in the logical address mode, so that after said block of high-order N bits and said block of low-order N bits have been sent by said sending means an address for accessing said main memory is provided whether said central processing unit is in the real address mode or the logical address mode.

7. A data processing system according to claim 6, further comprising:
retaining means for retaining a selected predetermined number of the bits of said block of high-order N bits of the address register sent out in said first of two stages when said central processing unit is in the real address mode; and
means for transferring said retained selected predetermined number of said high-order N bits with said block of low-order N bits of the address register sent out on the address bus in said second of said two stages to the main memory when said central processing unit is in the real address mode.

* * * * *

UNITED STATES PATENT AND TRADEMARK OFFICE
CERTIFICATE OF CORRECTION

PATENT NO. : 4,374,410
DATED : FEBRUARY 15, 1983
INVENTOR(S) : TOSHIHIRO SAKAI ET AL.

It is certified that error appears in the above-identified patent and that said Letters Patent is hereby corrected as shown below:

```
Front page, [75] Inventors, "Matsudo" should be
                 --Ishikawa--;
            [57] ABSTRACT, line 4, "2n" should be
                 --2N--.
Col. 1, line 27, "is;" should be --is,--;
        line 47, "15 th" should be --15th--.
Col. 2, line 31, delete "said".
Col. 3, line 1, after "low-order" insert --N--;
Col. 4, line 52, "202" (second occurrence) should be
                 --203--;
        line 53, after "201" insert --,--.
```

Signed and Sealed this

Twenty-fourth Day of January 1984

[SEAL]

Attest:

GERALD J. MOSSINGHOFF

Attesting Officer          Commissioner of Patents and Trademarks